US009497461B2

(12) United States Patent
Song et al.

(10) Patent No.: US 9,497,461 B2
(45) Date of Patent: *Nov. 15, 2016

(54) METHOD AND APPARATUS FOR ENCODING FREQUENCY TRANSFORMED BLOCK USING FREQUENCY MASK TABLE, AND METHOD AND APPARATUS FOR ENCODING/DECODING VIDEO USING SAME

(75) Inventors: Jinhan Song, Seoul (KR); Jeongyeon Lim, Gyeonggi-do (KR); Haekwang Kim, Seoul (KR); Joohee Moon, Seoul (KR); Yunglyul Lee, Seoul (KR); Jongki Han, Seoul (KR); Byeungwoo Jeon, Gyeonggi-do (KR)

(73) Assignee: SK TELECOM CO., LTD., Seoul (KR)

( * ) Notice: Subject to any disclaimer, the term of this patent is extended or adjusted under 35 U.S.C. 154(b) by 666 days.

This patent is subject to a terminal disclaimer.

(21) Appl. No.: 13/878,352

(22) PCT Filed: Sep. 30, 2011

(86) PCT No.: PCT/KR2011/007281
§ 371 (c)(1),
(2), (4) Date: May 10, 2013

(87) PCT Pub. No.: WO2012/046979
PCT Pub. Date: Apr. 12, 2012

(65) Prior Publication Data
US 2013/0230098 A1   Sep. 5, 2013

(30) Foreign Application Priority Data

Oct. 6, 2010 (KR) ........................ 10-2010-0097546

(51) Int. Cl.
*H04N 19/105* (2014.01)
*H04N 19/463* (2014.01)
(Continued)

(52) U.S. Cl.
CPC .......... *H04N 19/105* (2014.11); *H04N 19/126* (2014.11); *H04N 19/129* (2014.11); *H04N 19/176* (2014.11); *H04N 19/18* (2014.11); *H04N 19/463* (2014.11); *H04N 19/132* (2014.11)

(58) Field of Classification Search
CPC ..................... H04N 19/00781; H04N 19/105; H04N 19/126; H04N 19/129; H04N 19/176; H04N 19/18; H04N 19/463; H04N 19/132
USPC ........................................ 375/240.01–240.29
See application file for complete search history.

(56) References Cited

U.S. PATENT DOCUMENTS

2005/0084013 A1*  4/2005  Wang et al. ............. 375/240.18
2005/0254577 A1*  11/2005  Ando ................... H04N 19/176
                                                375/240.03

(Continued)

FOREIGN PATENT DOCUMENTS

JP          11-505350         5/1999
JP         2002-014700        1/2002

(Continued)

OTHER PUBLICATIONS

Korean Office Action dated Jan. 13, 2014.

(Continued)

*Primary Examiner* — William C Vaughn, Jr.
*Assistant Examiner* — Joseph A Towe
(74) *Attorney, Agent, or Firm* — Hauptman Ham, LLP

(57) ABSTRACT

A video encoding/decoding apparatus including a video encoder for generating a prediction block, generating a residual block by subtracting the prediction block from the current block. The video encoder is for generating a frequency-transformed block by transforming and quantizing the residual block, generating a masked frequency-transformed block by masking the frequency-transformed block by using one or more frequency mask tables. The video encoder is for encoding information about a frequency mask table used for masking the masked frequency-transformed block. The apparatus includes a video decoder for extracting a masked quantized frequency coefficient string recorded in the bitstream. The video decoder is for generating a quantized frequency coefficient string by zero setting all quantized frequency coefficients at positions of no records in the bitstream from a masked quantized frequency coefficient string. The video decoder is for generating a quantized frequency-transformed block by inversely scanning the generated quantized frequency coefficient string.

7 Claims, 12 Drawing Sheets

(51) Int. Cl.
  *H04N 19/132*  (2014.01)
  *H04N 19/18*   (2014.01)
  *H04N 19/126*  (2014.01)
  *H04N 19/129*  (2014.01)
  *H04N 19/176*  (2014.01)

(56) References Cited

U.S. PATENT DOCUMENTS

| | | | |
|---|---|---|---|
| 2006/0215768 A1* | 9/2006 | Kerofsky | H04N 19/176 375/240.28 |
| 2006/0262854 A1* | 11/2006 | Lelescu | H04N 19/176 375/240.16 |
| 2007/0285285 A1* | 12/2007 | Puri | H04N 19/105 341/50 |
| 2008/0046698 A1* | 2/2008 | Ahuja | G06F 9/30167 712/224 |
| 2010/0020867 A1* | 1/2010 | Wiegand | H04N 19/34 375/240.02 |
| 2010/0034478 A1* | 2/2010 | Kajiwara et al. | 382/248 |
| 2010/0046626 A1* | 2/2010 | Tu | H04N 19/176 375/240.18 |
| 2010/0150226 A1* | 6/2010 | Hallapuro | H04N 19/13 375/240.03 |
| 2011/0090967 A1* | 4/2011 | Chen | H04N 19/70 375/240.16 |
| 2011/0206135 A1* | 8/2011 | Drugeon | H04N 19/176 375/240.24 |

FOREIGN PATENT DOCUMENTS

| | | |
|---|---|---|
| JP | 2009170992 | 7/2009 |
| KR | 1020030005171 | 1/2003 |

OTHER PUBLICATIONS

International Search Report for PCT/KR2011/007281.

\* cited by examiner

| 1 | 1 | 1 | 0 | 0 | 0 | 0 | 0 |
|---|---|---|---|---|---|---|---|
| 1 | 1 | 1 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

*FIG. 3*

| 0 | -3 | 2 | 0 | 0 | 0 | 0 | 0 |
|---|---|---|---|---|---|---|---|
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

*FIG. 4A*

| 0 | -3 | 2 |
|---|---|---|
| 1 | 0 | 0 |

METHOD AND APPARATUS FOR ENCODING FREQUENCY TRANSFORMED BLOCK USING FREQUENCY MASK TABLE, AND METHOD AND APPARATUS FOR ENCODING/DECODING VIDEO USING SAME

This application is the U.S. national phase of PCT/KR2011/007281 filed Sep. 30, 2011, which claims priority to Patent Application No. 10-2010-0097546, filed on Oct. 6, 2010 in Korea, both of which are incorporated herein by reference in their entirety.

TECHNICAL FIELD

The present disclosure relates to a method and an apparatus for encoding a frequency-transformed block by using one or more frequency (coefficient) mask tables, and to a method and an apparatus for encoding/decoding video using the same.

BACKGROUND

The statements in this section merely provide background information related to the present disclosure and are not admitted as prior art.

Moving Picture Experts Group (MPEG) and Video Coding Experts Group (VCEG) have developed video compression technology that is superior to the existing MPEG-4 Part 2 and H.263 standard. This new standard is called H.264/AVC (advanced video coding) and was jointly announced as MPEG-4 Part 10 AVC and ITU-T Recommendation H.264.

In H.264/AVC (hereinafter, simply referred to as H.264) standard, a residual signal is generated by performing an intra/inter prediction process in units of macroblocks having various types of sub-blocks, and encoding is performed by frequency transform, quantization, and entropy encoding in frequency transform units of 4×4 units with respect to the generated residual signal.

Video compression technologies are currently in development to meet the needs for ultra-high video resolution. The international standard organizations, MPEG and VCEG have jointly developed HEVC moving picture encoding standard in the name of JCT. In the ultra-high-resolution compression, experiments have proved that, in addition to 4×4 and 8×8 frequency units having been widely used in the existing video compression technologies, large frequency transform unit such as 16×16 is helpful to improve video compression efficiency. However, if such 16×16 unit is scanned and encoded at a time in the existing method, devising and implementing efficient frequency coefficient encoding is difficult.

SUMMARY

One aspect of this description relates to a video encoding/decoding apparatus. The video encoding/decoding apparatus includes a video encoder for generating a prediction block by predicting a current block, generating a residual block by subtracting the prediction block from the current block. The video encoder further for generating a frequency-transformed block by transforming and quantizing the residual block, generating a masked frequency-transformed block by masking the frequency-transformed block based on one or more frequency mask tables. The video encoder further for encoding the masked frequency-transformed block and information about the frequency mask table(s) used for the masking. The video encoding/decoding apparatus further includes a video decoder for extracting a masked quantized frequency coefficient string recorded in a bitstream by extracting information about one or more frequency mask tables from the bitstream. The video decoder further for generating a quantized frequency coefficient string by zero setting all quantized frequency coefficients at positions of no records in the bitstream from a masked quantized frequency coefficient string, based on extracted information about the frequency mask tables. The video decoder further for generating a quantized frequency-transformed block by inversely scanning a generated quantized frequency coefficient string. The video decoder further for decoding the quantized frequency-transformed block.

Another aspect of this description relates to a video encoding apparatus including a prediction unit for generating a prediction block by predicting a current block. The video encoding apparatus further includes a subtraction unit for generating a residual block by subtracting the prediction block from the current block and a transform/quantization unit for generating a frequency-transformed block by transforming and quantizing the residual block. The video encoding apparatus further includes an encoding unit for generating a masked frequency-transformed block by masking the frequency-transformed block based on one or more frequency mask tables, and encoding the masked frequency-transformed block and information about the one or more frequency mask tables used for the masking.

Another aspect of this description relates to a video decoding apparatus including a decoding unit. The decoding unit for extracting a masked quantized frequency coefficient string recorded in a bitstream by extracting information about one or more frequency mask tables from the bitstream, and generating a quantized frequency coefficient string by zero setting all quantized frequency coefficients at positions of no records in the bitstream from a masked quantized frequency coefficient string, based on the frequency mask tables. The decoding unit further for generating a quantized frequency-transformed block by inversely scanning a generated quantized frequency coefficient string. The video decoding apparatus further includes an inverse quantization/inverse transform unit for reconstructing a residual block by inversely quantizing and inversely transforming the frequency-transformed block. The video decoding apparatus further includes a prediction unit for generating a prediction block by predicting a current block and an addition unit for reconstructing the current block by adding a reconstructed residual block and the prediction block.

Another aspect of this description relates to a frequency-transformed block encoding apparatus. The frequency transformed block encoding apparatus includes a frequency mask unit for generating a masked frequency-transformed block by masking a frequency-transformed block with one or more frequency mask tables. The frequency transformed block encoding apparatus further includes a frequency scan unit for generating a masked frequency coefficient string by scanning the masked frequency-transformed block. The frequency transformed block encoding apparatus further includes a mask block encoding unit for encoding the masked frequency coefficient string and a table information encoding unit for encoding information about the one or more frequency mask table used for masking the frequency-transformed block.

Another aspect of this description relates to a frequency-transformed block encoding apparatus. The frequency transformed block encoding apparatus further includes a frequency scan unit for generating a frequency coefficient string by scanning a frequency-transformed block. The frequency transformed block encoding apparatus further includes a frequency mask unit for scanning one or more frequency mask tables and generating a masked frequency coefficient string by masking the frequency coefficient string based on the scanned one or more frequency mask tables. The frequency transformed block encoding apparatus further includes a mask block encoding unit for encoding the masked frequency coefficient string and a table information encoding unit for encoding information about the one or more frequency mask tables used for masking the frequency-transformed block.

Another aspect of this description relates to a video encoding/decoding method. The method includes a video encoding process for generating a prediction block by predicting a current block, generating a residual block by subtracting the prediction block from the current block, and generating a frequency-transformed block by transforming and quantizing the residual block, and generating a masked frequency-transformed block by masking the frequency-transformed block based on one or more frequency mask tables. The video encoding process includes encoding the masked frequency-transformed block and information about the frequency mask table(s) used for the masking. The method further includes a decoding process for extracting a masked quantized frequency coefficient string recorded in a bitstream by extracting information about one or more frequency mask tables from the bitstream, and generating a quantized frequency coefficient string by zero setting all quantized frequency coefficients at positions of no records in the bitstream from a masked quantized frequency coefficient string, based on extracted information about the frequency mask tables, and generating a quantized frequency-transformed block by inversely scanning a generated quantized frequency coefficient string. The decoding process includes decoding the quantized frequency-transformed block.

Another aspect of this description relates to a video encoding method. The method includes performing a prediction process for generating a prediction block by predicting a current block and performing a subtraction process for generating a residual block by subtracting the prediction block from the current block. The method further includes performing a transform/quantization process for generating a frequency-transformed block by transforming and quantizing the residual block and performing an encoding process for generating a masked frequency-transformed block by masking the frequency-transformed block by using one or more frequency mask tables, and encoding the masked frequency-transformed block and information about the frequency mask used for the masking.

Another aspect of this description relates to a video decoding method. The method includes performing a decoding process for extracting a masked quantized frequency coefficient string recorded in a bitstream by extracting information about one or more frequency mask tables from the bitstream, and generating a quantized frequency coefficient string by zero setting all quantized frequency coefficients at positions of no records in the bitstream from a masked quantized frequency coefficient string, by using the one or more frequency mask tables, and generating a quantized frequency-transformed block by inversely scanning a generated quantized frequency coefficient string. The method further includes performing an inverse quantization/inverse transform process for reconstructing a residual block by inversely quantizing and inversely transforming the frequency-transformed block. The method further includes performing a prediction process for generating a prediction block by predicting a current block and performing an addition process for reconstructing the current block by adding a reconstructed residual block and the prediction block.

Another aspect of this description relates to a frequency-transformed block encoding method. The method includes performing a frequency masking process for generating a masked frequency-transformed block by masking a frequency-transformed block with one or more frequency mask tables and performing a frequency scanning process for generating a masked frequency coefficient string by scanning the masked frequency-transformed block. The method further includes performing a mask block encoding process for encoding the masked frequency coefficient string and performing a table information encoding process for encoding information about the one or more frequency mask tables used for masking the frequency-transformed block.

Another aspect of this description relates to a frequency-transformed block encoding method. The method includes performing a frequency scanning process for generating a frequency coefficient string by scanning a frequency-transformed block and performing a frequency masking process for scanning one or more frequency mask tables and generating a masked frequency coefficient string by masking the frequency coefficient string by using the scanned one or more frequency mask tables. The method further includes performing a mask block encoding process for encoding the masked frequency coefficient string and performing a table information encoding process for encoding information about the one or more frequency mask tables used for masking the frequency-transformed block.

DESCRIPTION OF DRAWINGS

FIG. 3 is a diagram of an exemplary frequency mask table for an 8×8 frequency-transformed block according to at least one embodiment of the present disclosure;

FIG. 4A is a diagram of an example of a quantized residual frequency-transformed block in frequency transform unit of 8×8 according to at least one embodiment of the present disclosure;

FIG. 4B is a diagram of a result when the quantized frequency-transformed block is masked with the frequency mask table of FIG. 3 according to at least one embodiment of the present disclosure;

FIG. 6B is a diagram of a frequency mask coefficient string after scanning according to at least one embodiment of the present disclosure;

DETAILED DESCRIPTION

Figure 1:
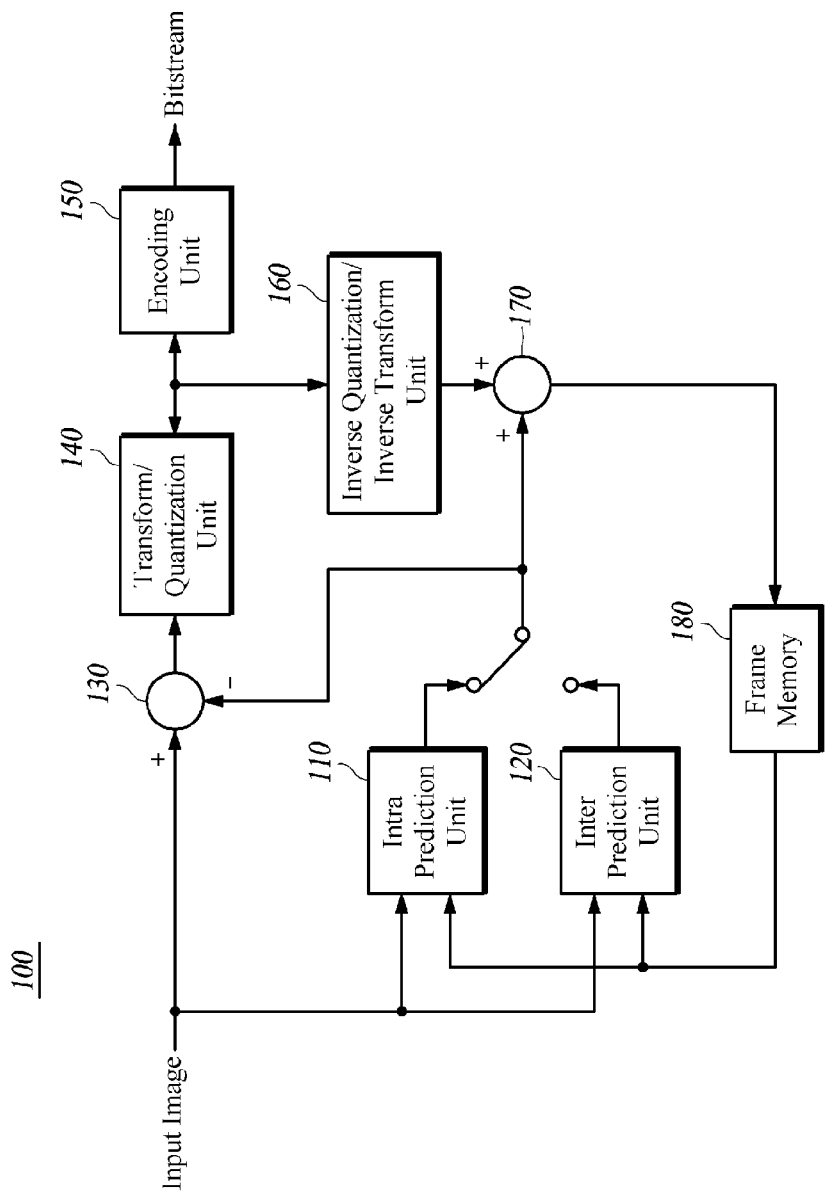
FIG. 1 is a block diagram of a video encoding apparatus according to at least one embodiment of the present disclosure.

The embodiments of the present disclosure are directed to improve video compression efficiency into easy implementation by encoding a frequency-transformed block while reflecting video characteristic by using a frequency mask table including non-encoding information according to a position of a frequency coefficient of a residual block.

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, terms are used like first, second, A, B, (a), and (b). These are solely for the purpose of differentiating one component from the other but not to imply or suggest the substances, order or sequence of the components. If a component were described as 'connected', 'coupled', or 'linked' to another component, the terms mean the components are not only directly 'connected', 'coupled', or 'linked' but also are indirectly 'connected', 'coupled', or 'linked' via a third component.

A video encoding apparatus and a video decoding apparatus according to one or more embodiments, as described below, in some embodiments, are a user terminal, such as a personal computer (PC), a notebook computer, a personal digital assistant (PDA), a portable multimedia player (PMP), a PlayStation Portable (PSP), or a wireless communication terminal, a smart phone, or the like, or a server terminal, such as an application server and a service server, and refer to a variety of apparatuses equipped with, for example, a communication device, such as a communication modem for performing communications between various devices or wired/wireless communication networks, a memory for storing various programs for encoding or decoding videos or performing inter or intra prediction for encoding or decoding, and relevant data, and a microprocessor for executing the programs to perform operations and controls.

In addition, the video encoded into a bitstream by the video encoding apparatus is transmitted in real time or non-real-time to the video decoding apparatus for decoding the same where the video is reconstructed and reproduced after being transmitted via a wired/wireless communication network including Internet, a wireless personal area network (WPAN), a wireless local area network (WLAN), a WiBro (aka WiMax) network, a mobile communication network, or a communication interface such as a cable or a universal serial bus (USB), in some embodiments.

In general, a moving picture is composed of a series of pictures, each of which is divided into predetermined areas, such as frames or blocks, according to at least one embodiment. When a picture is divided into blocks, the divided blocks are largely classified into intra blocks and inter blocks according to an encoding method, in some embodiments. The intra block refers to a block encoded by an intra prediction coding method. The intra prediction encoding is a method that generates a prediction block by predicting a pixel of a current block by using pixels of blocks reconstructed by being previously encoded and decoded within a current pixel being currently encoded, and encodes a difference value from the pixel of the current block. The inter block refers to a block encoded by an inter prediction coding. The inter prediction coding is a method that generates a prediction block by predicting a current block within a current picture with reference to one or more previous pictures or next pictures, and encodes a difference value from the current block. A frame referenced for encoding or decoding the current picture is called a reference frame.

FIG. 1 is a block diagram of a video encoding apparatus 100 according to one or more embodiments of the present disclosure.

The video encoding apparatus 100 according to at least one embodiment of the present disclosure includes an intra-prediction unit 110, an inter prediction unit 120, a subtraction unit 130, a transform/quantization unit 140, an encoding unit 150, an inverse quantization/inverse transform unit 160, an addition unit 170, and a frame memory 180.

A video to be encoded is input in units of macroblocks. In the present disclosure, the macroblock has an M×N form, wherein each of M and N has a magnitude of $2^n$ and are equal to or different from each other. Therefore, the macroblock is equal to or larger than a macroblock of H.264.

The intra prediction unit 110 generates a prediction block by using adjacent pixels so as to predict a current macroblock. That is, the intra prediction unit 110 generates a prediction block according to a mode of the intra prediction unit 110 by using adjacent pixels of a reconstructed current macroblock having already undergone an encoding process.

The inter prediction unit 120 generates a prediction block by using another frame so as to predict the current macroblock. That is, the inter prediction unit 120 generates a motion vector through a motion estimation according to a mode of the inter prediction unit 120 in a reconstructed previous frame having already undergone an encoding process, and generates a prediction block in a motion compensation process using a motion vector.

The subtraction unit 130 generates a residual block by subtracting the prediction block from the current block. That is, the subtraction unit 130 generates a residual block by subtracting a pixel value of the prediction block generated in the intra prediction unit 110 or the inter prediction unit 120 from a pixel value of the current block.

The transform/quantization unit 140 transforms the residual block generated in the subtraction unit 130 into a frequency coefficient and quantizes the transformed residual block. That is, the transform/quantization unit 140 generates the residual block having frequency coefficient from a residual coefficient of the residual block generated by the subtraction unit 130, and quantizes the residual block of the generated frequency coefficient. In this case, the transform method to be used includes a technique for transforming a video signal of spatial domain into frequency domain, such as Hadamard transform or discrete cosine transform based integer transform. For the quantization, various quantization methods are used such as dead zone uniform threshold quantization (DZUTQ), in some embodiments.

The encoding unit 150 generates encoded data by encoding the residual block transformed and quantized by the transform/quantization unit 140. Although, in some embodiments, an entropy encoding technology is used for the encoding method, the present disclosure is not limited thereto, and a variety of encoding technologies are also usable.

In addition, in some embodiments, the encoding unit 150 includes a bitstream which is obtained by encoding the quantized frequency coefficients and a variety of information which is necessary for decoding the encoded bitstream, into encoded data. That is, the encoding data includes a first field having a bitstream obtained by encoding a coded block pattern (CBP), a delta quantization parameter and a quantized frequency coefficient, and a second field having a bit for information necessary for prediction (for example, intra prediction mode in the case of intra prediction, or motion vector in the case of inter prediction).

In at least one embodiment, unlike H.264, when encoding the quantized residual block of the frequency coefficient, the quantized frequency block is scanned and encoded by using a frequency mask table including "non-encoding" information according to a position of the frequency coefficient of the residual block. The relevant details will be described below with reference to FIG. 2.

The inverse quantization/inverse transform unit 160 reconstructs the residual block by inversely quantizing and inversely transforming the residual block transformed and quantized by the transform/quantization unit 140. The inverse quantization and inverse transform is achieved by inversely performing the transform and quantization process of the transform/quantization unit 140, in some embodiments. That is, the inverse quantization/inverse transform unit 160 performs the inverse quantization and inverse transform by inversely performing the transform and quantization method of the transform/quantization unit 140 by using information about the transform and quantization generated and transferred from the transform/quantization unit 140 (for example, information about transform and quantization types).

The addition unit 170 generates a reconstructed block by adding the prediction block generated by the intra prediction unit 110 or the inter prediction unit 120 and the residual block generated by the inverse quantization/inverse transform unit 160.

The frame memory 180 stores the block reconstructed by the addition unit 170 and uses the reconstructed block as the reference block so as to generate the prediction block using the intra prediction unit 110 or inter prediction unit 120. In some embodiments, a video encoding apparatus is capable of selecting between the intra prediction unit 110 and the inter prediction unit 120, e.g., using a switch.

Figure 2:
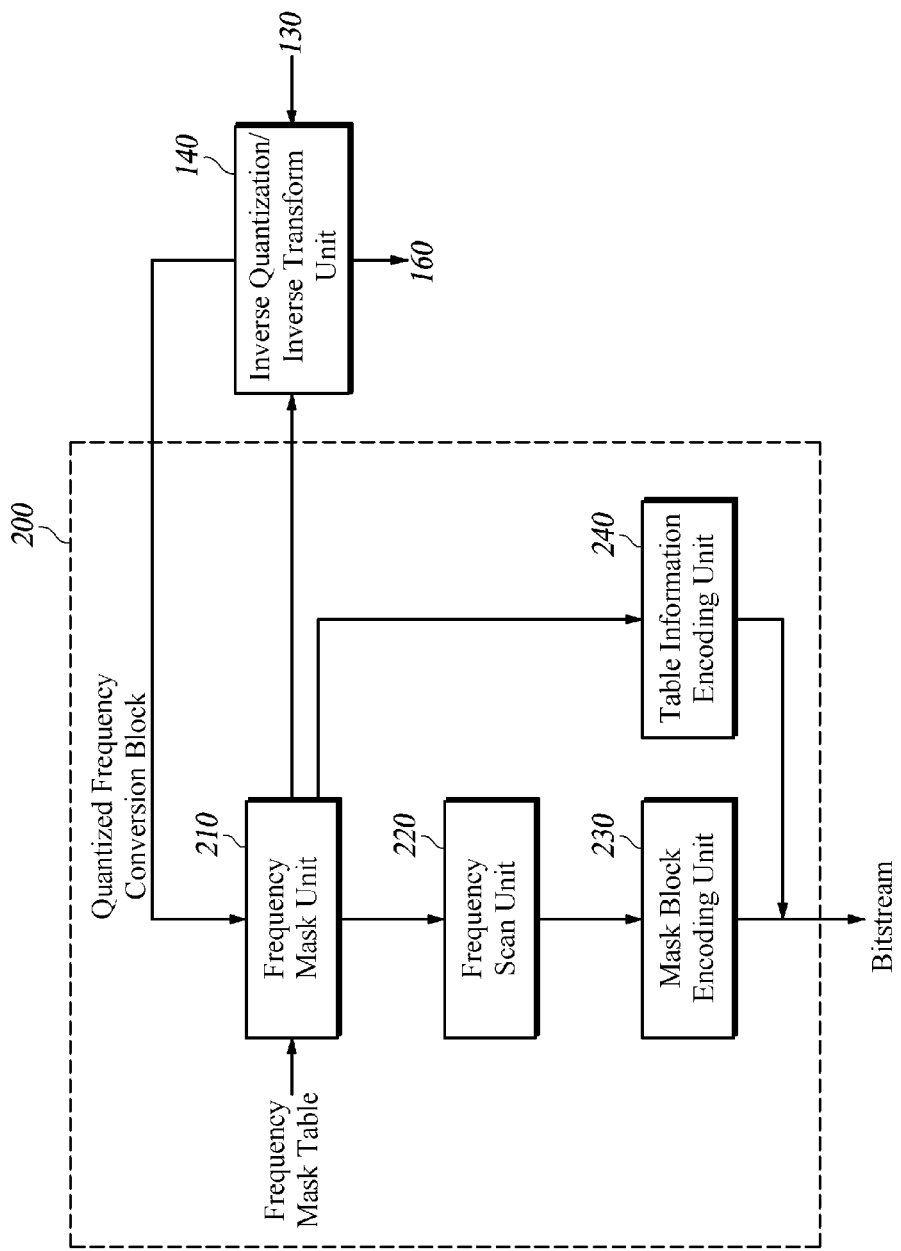
FIG. 2 is a block diagram of a frequency-transformed block encoding apparatus according to at least one embodiment of the present disclosure.

FIG. 2 is a diagram of a frequency-transformed block encoding apparatus 200 according to at least one embodiment of the present disclosure. In some embodiments, the encoding unit 150 of FIG. 1 includes the frequency-transformed block encoding apparatus 200 according to at least one embodiment of the present disclosure.

The frequency-transformed block encoding apparatus 200 is a motion compensation apparatus existing as an independent hardware or software module, in some embodiments.

The frequency-transformed block encoding apparatus 200 according to at least one embodiment of the present disclosure includes a frequency mask unit 210, a frequency scan unit 220, a mask block encoding unit 230 and a table information encoding unit 240.

The frequency mask unit 210 generates a masked frequency-transformed block by masking the quantized frequency-transformed block by using the frequency mask table.

The frequency scan unit 220 generates a masked frequency coefficient string by scanning the masked frequency-transformed block.

The mask block encoding unit 230 encodes the masked frequency coefficient string.

The table information encoding unit 240 encodes information about the frequency mask table used for masking the quantized frequency-transformed block.

FIG. 3 is a diagram of an example of a frequency mask table for an 8×8 frequency-transformed block according to at least one embodiment of the present disclosure.

The frequency mask table as shown in FIG. 3 is defined for all N×M frequency-transformed blocks (where N and M may be equal to or different from each other). The values of the frequency mask table represent information indicating whether to encode the corresponding frequency coefficients in the bitstream generated by encoding at the corresponding frequency coefficient positions of the frequency-transformed block. The frequency-transformed block progresses from a low frequency coefficient to a high frequency coefficient from a left top to a right bottom of the block. In some embodiments, the frequency mask table also progresses from a low frequency coefficient to a high frequency coefficient from a left top to a right bottom. In the frequency mask table of FIG. 3, with a portion corresponding to "1", the frequency coefficient of the corresponding position of the frequency-transformed block is entropy-encoded and output to a bitstream, and with a portion corresponding to "0", the frequency coefficient of the corresponding position of the frequency-transformed block is not entropy-encoded and is set to "0".

FIG. 4A is a diagram of an example of a quantized residual frequency-transformed block in frequency transform unit of 8×8 according to at least one embodiment of the present disclosure. FIG. 4B is a diagram of a result when the quantized frequency-transformed block is masked with the frequency mask table of FIG. 3 according to at least one embodiment of the present disclosure. The residual frequency-transformed block of FIG. 4A constitutes and encodes a frequency coefficient string composed of sixty-four quantized frequency coefficients by a scanning method, such as a zigzag scanning.

In at least one embodiment of the present disclosure, when the frequency mask unit 210 masks the quantized residual frequency-transformed block of FIG. 4A by using the frequency mask table of FIG. 3, the frequency scan unit 220 scans only six frequency positions represented by "1" in the frequency mask table of FIG. 3, and the mask block encoding unit 230 encodes the coefficient string in which only six frequency positions are scanned, thereby improving compression efficiency in comparison with another video encoding apparatus. Therefore, when the quantized frequency-transformed block of FIG. 4A is masked with the frequency mask table of FIG. 3, the result obtained is shown in FIG. 4B, in some embodiments.

In some embodiments, when encoding the masked frequency coefficient string, the mask block encoding unit 230 uses an entropy encoding technique for the encoding method as with the encoding unit 150, but the present disclosure is not limited thereto. A variety of other encoding techniques are usable.

Meanwhile, the frequency mask unit 210 generates a masked frequency-transformed block by using a frequency mask table having the lowest encoding cost by performing a rate-distortion comparison among a plurality of frequency mask tables with respect to any one image unit from a block including one or more frequency transform units, macroblock, picture or slice.

In addition, when there are multiple sizes of frequency transform units constituting any one image unit from a block including one or more frequency transform units, macroblock, picture or slice; the frequency mask unit 210 generates a masked frequency-transformed block with the frequency mask table having the lowest encoding cost by performing a rate-distortion comparison for respective frequency transform units, in some embodiments.

The frequency scan unit 220 generates the masked frequency-transformed block by using a same frequency mask table for each slice or picture, in some embodiments.

The table information encoding unit 240 scans and encodes frequency mask tables, in some embodiments.

In order to improve compression efficiency, the table information encoding unit 240 encodes the frequency mask tables into a bitstream by sending a common frequency mask table with respect to a plurality of frequency transform units, instead of sending the frequency mask tables one by one for the respective frequency transform units, in some embodiments.

In at least one embodiment, by including one frequency mask table in header information of the slice, the table information encoding unit 240 uses the corresponding frequency mask table when all frequency-transformed blocks in one slice are masked in the video decoding apparatus as well as the video encoding apparatus.

In at least one embodiment, by including one frequency mask table in header information of the picture, the table information encoding unit 240 uses a corresponding frequency mask table when all frequency-transformed blocks in one slice are masked in the video decoding apparatus as well as the video encoding apparatus.

In at least one embodiment, the table information encoding unit 240 includes a plurality of frequency mask tables and identification information (for example, index) thereof in a slice header, and encodes an index of a corresponding frequency mask table for each block including each macroblock or a plurality of frequency transform units and outputs the encoded index to the bitstream.

In at least one embodiment, the table information encoding unit 240 includes a plurality of frequency mask tables and indexes thereof in a picture header, and encodes an index of a corresponding frequency mask table for each block including each macroblock or a plurality of frequency transform units and outputs the encoded index to the bitstream.

In at least one embodiment, the table information encoding unit 240 includes a plurality of frequency mask tables and indexes thereof in a sequence header, and encodes an index of a corresponding frequency mask table for each block including each macroblock or a plurality of frequency transform units and outputs the encoded index to the bitstream.

In at least one embodiment, in order to generate a frequency mask table to be used for masking (which is generated from a set of various preset frequency mask tables), the frequency mask unit 210 selects the best frequency mask table in terms of a bit rate-distortion (RD) by using a plurality of frequency mask tables with respect to a video encoding unit (a picture, slice, macroblock, set of frequency transform units) sharing the frequency mask table. The table information encoding unit 240 improves the compression ratio by encoding one frequency mask table with respect to a corresponding image unit and outputting the encoded frequency mask table to the bitstream, in some embodiments.

Figure 11:
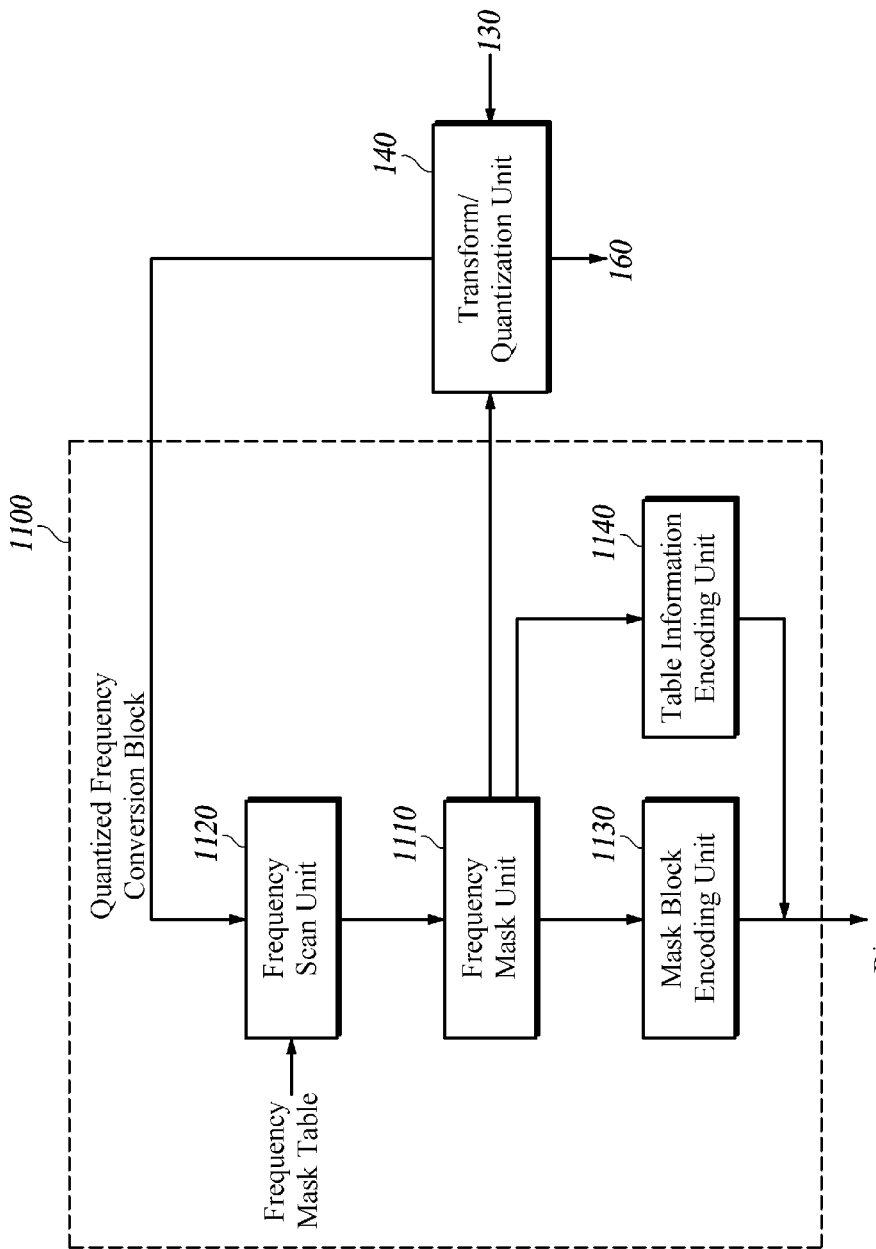
FIG. 11 is a block diagram of a frequency-transformed block encoding apparatus according to at least one embodiment of the present disclosure.

FIG. 11 is a diagram of a frequency-transformed block encoding apparatus 1100 according to at least one embodiment of the present disclosure.

The frequency-transformed block encoding apparatus 1100 according to at least one embodiment of the present disclosure includes a frequency mask unit 1110, a frequency scan unit 1120, a mask block encoding unit 1130, and a table information encoding unit 1140.

As shown in FIG. 11, the processing procedures of the frequency scan unit 1120 and frequency mask unit 1110 in the frequency-transformed block encoding apparatus 1100 is the reverse of those of the frequency scan unit 220 and frequency mask unit 210 shown in FIG. 2.

The frequency scan unit 1120 generates a frequency coefficient string by scanning a quantized frequency-transformed block. As shown in FIG. 4A, the frequency scan unit 1120 generates a frequency coefficient string by scanning a quantized frequency-transformed block.

The frequency mask unit 1110 scans a frequency mask table, and generates a masked frequency coefficient string by masking a frequency coefficient string by the scanned frequency mask string. The frequency mask unit 1110 scans a frequency mask table as shown in FIG. 3, and generates a masked frequency coefficient string by masking only a frequency coefficient string of a position corresponding to "1" of the scanned frequency mask string.

The mask block encoding unit 1130 entropy-encodes the generated masked frequency coefficient string. Since this is similar to the operation of the mask block encoding unit 230 of the mask block encoding unit 1130, a detailed description thereof will be omitted.

The table information encoding unit 1140 encodes information about the frequency mask table used, and encodes the scanned frequency mask table. Since the remaining operation of the table information encoding unit 1140 is similar to the operation of the table information encoding unit 240, a detailed description thereof will be omitted.

Figure 5:
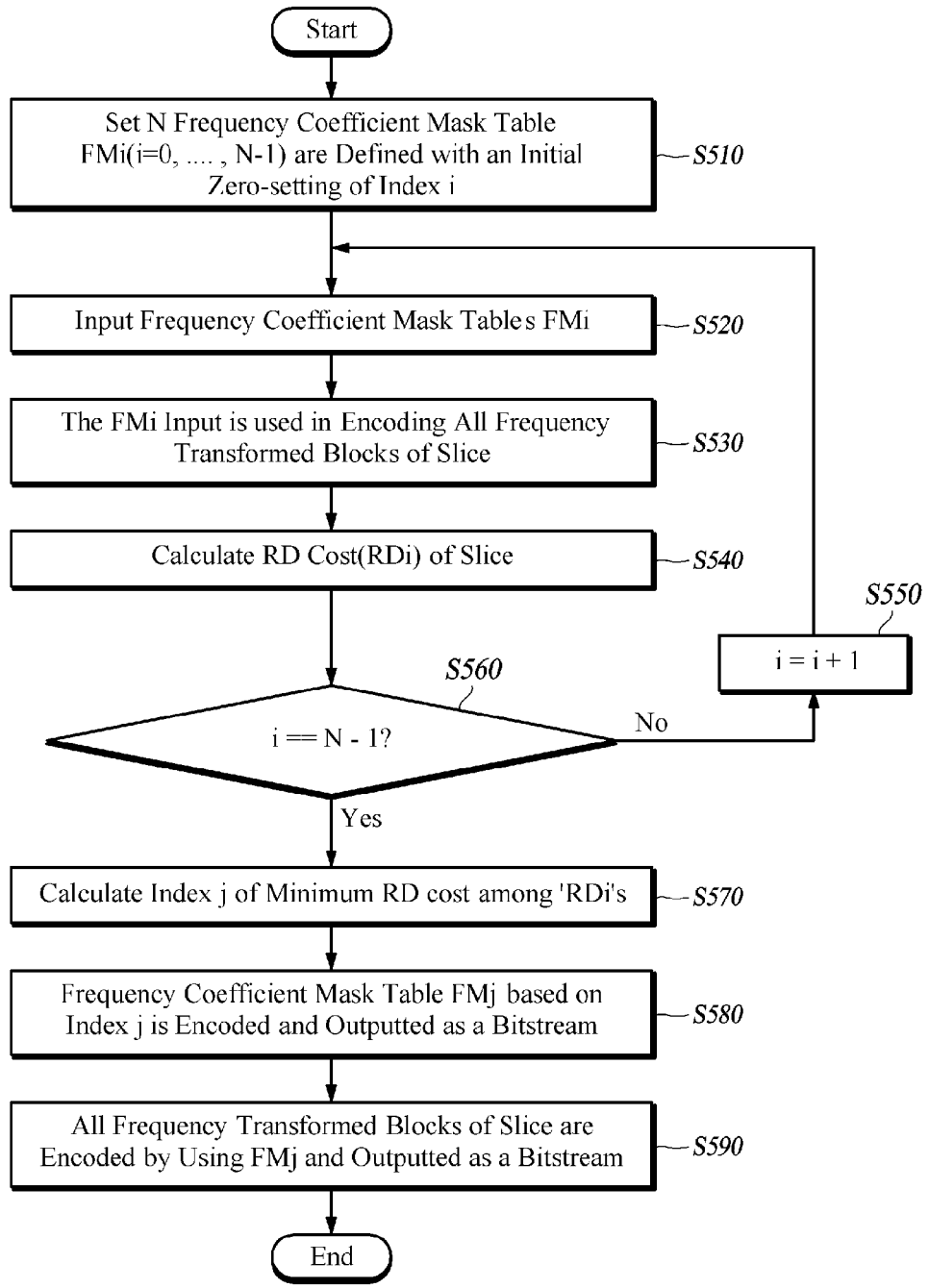
FIG. 5 is a flow chart of a method of generating a frequency mask table and encoding a slice according to some embodiments of the present disclosure.

FIG. 5 is a diagram of a flow chart of a method of encoding a slice by generating frequency mask tables according to some embodiments of the present disclosure. In FIG. 5, the frequency-transformed blocks of the slice have a common size.

According to at least one embodiment of the present disclosure, when there are multiple sizes of the frequency-transformed blocks constituting the slice, the frequency mask unit 210 generates the optimum mask table having the lowest encoding cost in terms of rate-distortion with respect to each frequency-transformed block, and generates a masked frequency-transformed block by using the optimum frequency mask table. The frequency scan unit 220 generates a masked frequency coefficient string by scanning the masked frequency-transformed block. The mask block encoding unit 230 encodes the masked frequency coefficient string generated by the frequency scan unit 220. The table information encoding unit 240 encodes information about the frequency mask table used for masking a quantized frequency-transformed block (which is a frequency mask table or frequency mask table identification information). In at least one embodiment, the frequency mask table is set to each of frequency-transformed blocks having various sizes (4×4, 4×8, 8×4, 8×8, 8×16, 16×8, 16×16, 16×32, 32×16, 32×32, 64×32, 32×64, 64×64). In addition, various types of frequency mask tables are set to the frequency-transformed block of each size, in some embodiments. The frequency mask unit 210 selects and uses one of the frequency mask tables, in some embodiments.

The table encoding unit 240 generates the frequency mask coefficient string by scanning the frequency mask table and entropy-encodes the frequency mask coefficient string.

Figure 6A:
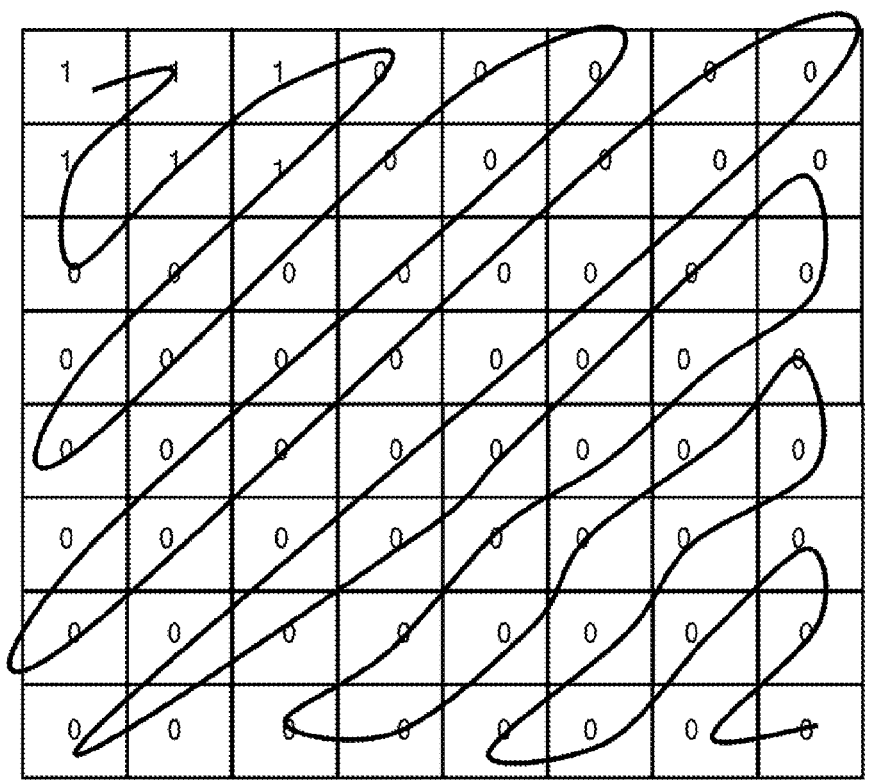
FIG. 6A is a diagram of a zigzag scanning of coefficients of the frequency mask table shown in FIG. 3 according to at least one embodiment of the present disclosure.

FIG. 6A is a diagram of a zigzag scanning of the coefficients of the frequency mask table shown in FIG. 3 according to at least one embodiment of the present disclosure. FIG. 6B is a diagram of the frequency mask coefficient string after scanning according to at least one embodiment of the present disclosure.

In at least one embodiment, the scanning of the coefficients of the frequency mask table is identical or similar to the method used for encoding the frequency coefficient block in the conventional video encoding. A zigzag scanning, horizontal scanning or vertical scanning is applied, in some embodiments.

The method for entropy-encoding the frequency mask coefficient string according to at least one embodiment of the present disclosure uses a variable length coding method, arithmetic coding method or the like, but the present disclosure is not limited thereto.

In at least one embodiment, the method for entropy-encoding the frequency mask coefficient string encodes "0" into a bit value 0 and encodes "1" into a bit value 1.

In at least one embodiment, the method for entropy-encoding the frequency mask coefficient string is similar to 4×4 context adaptive variable length coding (CAVLC) of MPEG-4. When the frequency mask efficient string starts from a high frequency and ends with a low frequency, 0s are concentrated on a rear part of the frequency mask coefficient string due to a characteristic of the video. Taking advantage of this fact, encoding is performed on information of a position where the frequency mask coefficient "1" first appears, starting from the rear part. The encoding continues toward the low frequency region until the frequency mask coefficients 0s and 1s are encoded, in some embodiments.

Figure 7:
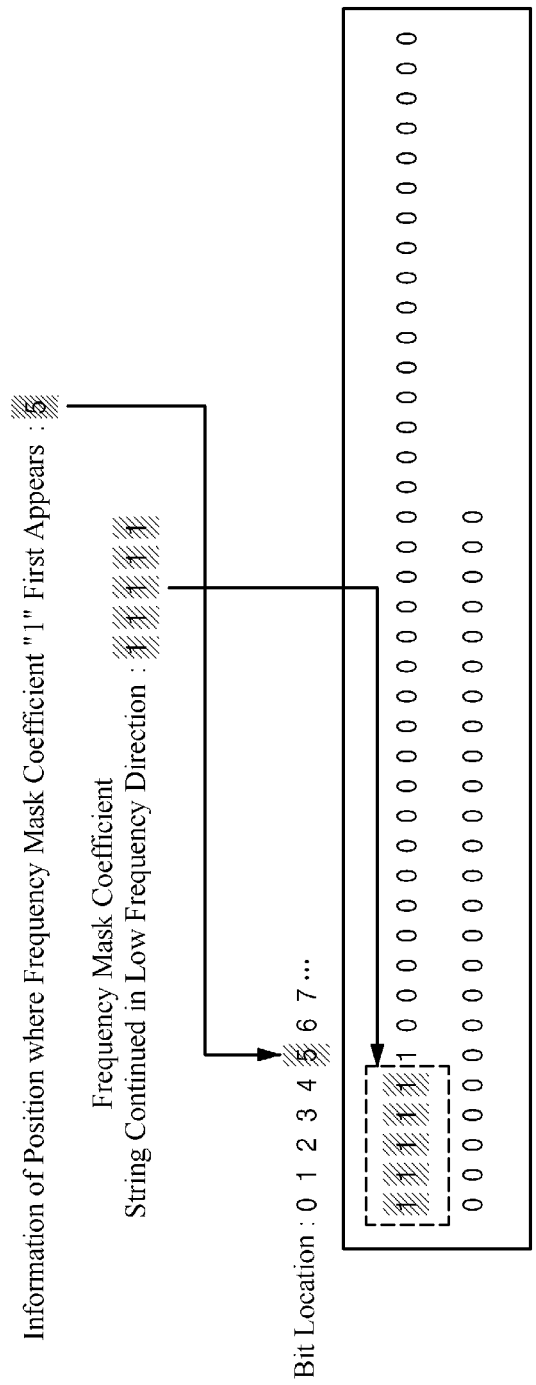
FIG. 7 is a diagram of an example of encoding the frequency mask coefficients of FIG. 6 according to at least one embodiment of the present disclosure.

FIG. 7 is a diagram of an example of encoding the frequency mask coefficients of FIG. 6 according to at least one embodiment.

The frequency mask coefficient string of FIG. 6 is recorded as shown in FIG. 7. In FIG. 7, recording is performed on 5 ("000101": in the case of using 6 bits for recording sixty-four coefficient locations) for informing where the frequency mask coefficient "1" first appears, starting from the rear. The recording continues toward the low frequency region until the frequency mask coefficient "11111" is recorded. Therefore, "00010111111" is recorded in the bitstream, thereby efficiently encoding the frequency mask table.

In this case, encoding the information about the position where the frequency mask coefficient "1" first appears, starting from the rear, is realized by variable length coding or arithmetic coding, based on probability.

According to the quantization method of at least one embodiment, only the frequency coefficient position valued "1" is quantized by using the frequency mask table and is scanned to generate the frequency mask coefficient string, thereby reducing the complexity of computation. That is, the frequency mask unit 210 transmits information about the frequency mask table to the transform/quantization unit 140 which quantizes only the frequency coefficient position of value 1, by using the frequency mask table when quantizing the frequency-transformed block.

Figure 8:
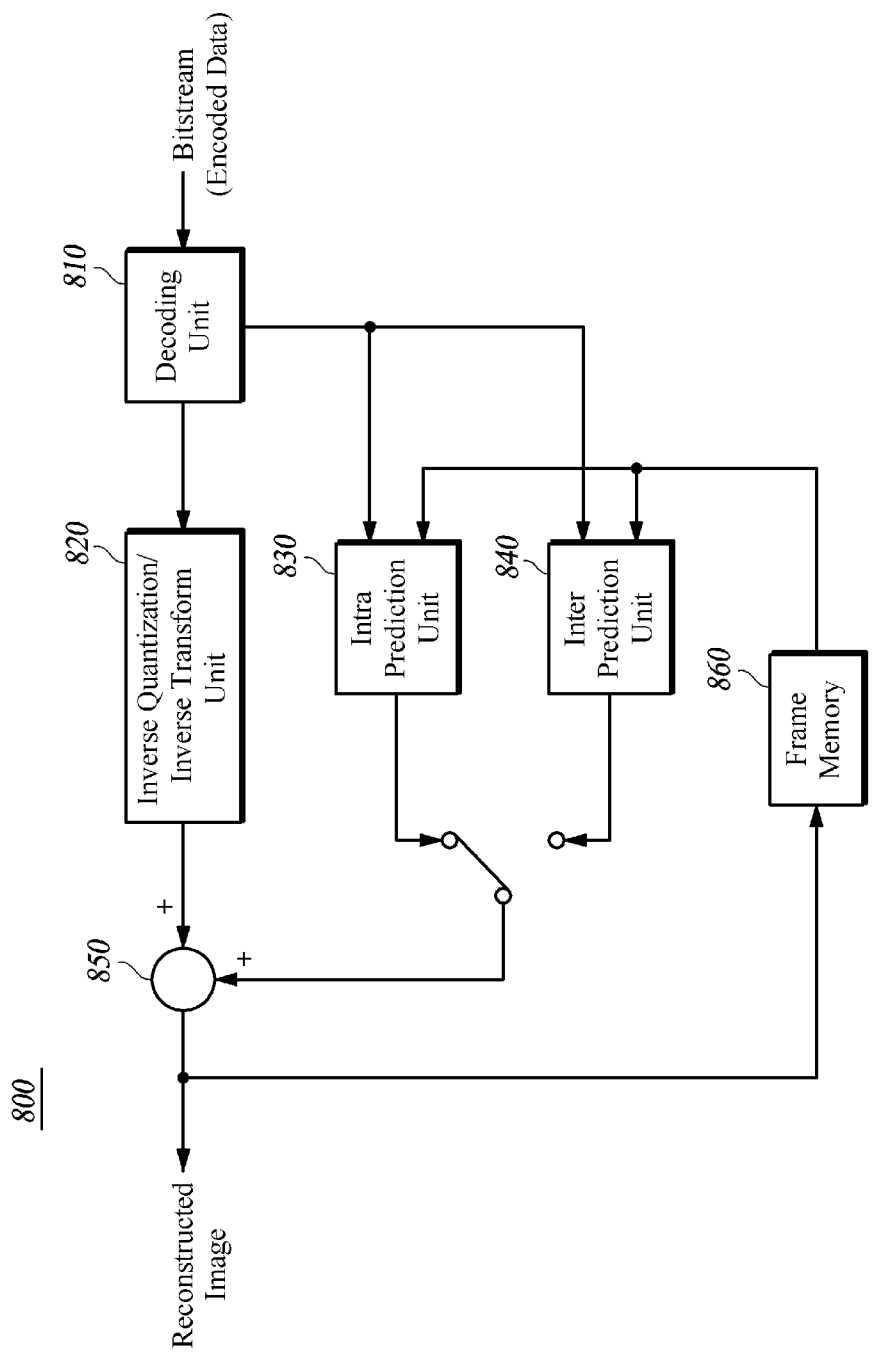
FIG. 8 is a block diagram of a configuration of a video decoding apparatus according to at least one embodiment of the present disclosure.

FIG. 8 is a block diagram of a configuration of a video decoding apparatus 800 according to at least one embodiment of the present disclosure.

The video decoding apparatus 800 according to at least one embodiment of the present disclosure includes a decoding unit 810, an inverse quantization/inverse transform unit 820, an intra prediction unit 830, an inter prediction unit 840, an addition unit 850 and a frame memory 860.

The decoding unit 810 extracts information necessary for decoding a block by decoding encoded data, in some embodiments. That is, the decoding unit 810 extracts frequency mask table information by decoding encoded data, extracts a quantized frequency coefficient string by using the extracted frequency mask table information, and generates a residual block having the quantized frequency coefficient by inversely scanning the quantized frequency coefficient string. In this case, the decoding unit 810 extracts and decodes an encoded residual block from a first field contained in the encoded data, extracts information necessary for prediction from a second field contained in the encoded data, and transfers the information necessary for prediction to the intra prediction unit 830 or the inter prediction unit 840, so that the corresponding prediction unit is able to predict a current block in the same manner as the corresponding prediction unit of the video encoding apparatus 100.

The inverse quantization/inverse transform unit 820 generates an inversely quantized residual block by inversely quantizing the residual block, and generates a residual block by inversely transforming the generated quantized block.

The intra prediction unit 830 generates a prediction block of the current block by using information necessary for intra prediction transferred from the decoding unit 810.

The inter prediction unit 840 generates a prediction block of the current block by using information necessary for inter prediction transferred from the decoding unit 810.

The addition unit 850 reconstructs the current block by adding the inversely transformed residual block and the prediction block. The current block reconstructed by the addition unit 850 is transferred to the frame memory 860, and is used to predict other blocks in the prediction unit, in some embodiments.

The frame memory 860 stores the reconstructed video and enables the generation of intra and inter prediction blocks.

Meanwhile, the decoding unit 810 decodes or extracts pieces of information necessary for decoding, as well as the transformed and quantized residual block, by decoding the encoded data. The pieces of information necessary for decoding refer to pieces of information for decoding the encoded bitstream within the encoded data. For example, the pieces of information include information about the block type, information about the intra prediction mode in the case where the prediction mode is the intra prediction mode, information about the motion vector in the case where the prediction mode is the inter prediction mode, or information on the transform/quantization type, or various other pieces of information.

Figure 9:
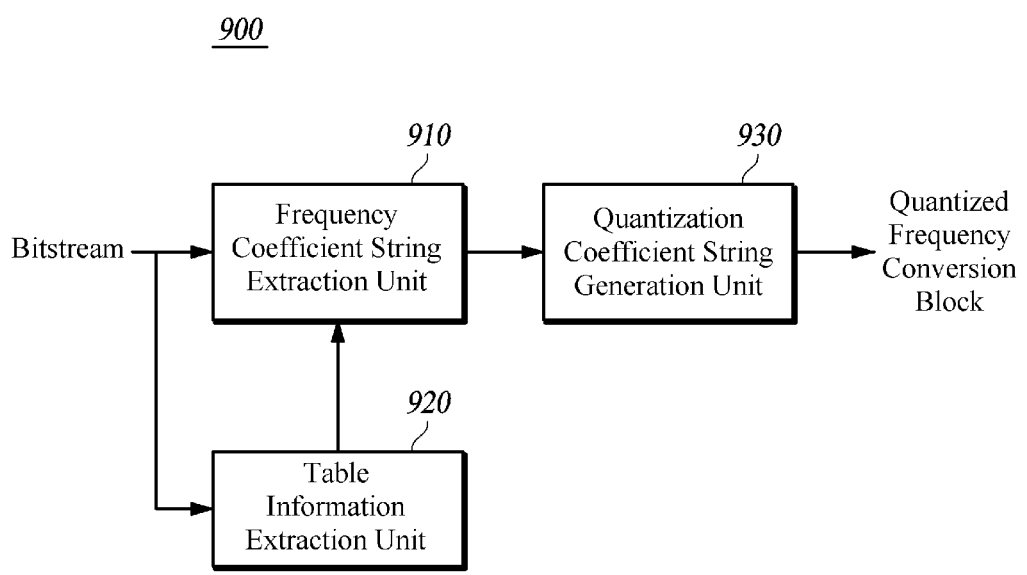
FIG. 9 is a block diagram of a configuration of a frequency coefficient string decoding apparatus according to at least one embodiment of the present disclosure.

FIG. 9 is a block diagram of a configuration of a frequency coefficient string decoding apparatus 900 according to at least one embodiment of the present disclosure. The decoding unit 810 of FIG. 8 includes the frequency coefficient string decoding apparatus 900 according to at least one embodiment of the present disclosure.

The frequency coefficient string decoding apparatus 900 includes a frequency coefficient string extraction unit 910, a table information extraction unit 920, and a quantized coefficient string generation unit 930.

The table information extraction unit 920 extracts the frequency mask table information from the bitstream. The frequency mask table information is one or more frequency mask tables or frequency mask table identification information, in some embodiments. The frequency mask tables are identical for each slice or each picture, and are different for each block including one or more frequency transform, in some embodiments. The frequency mask table information is identification information of the corresponding frequency mask table for each macroblock or each block including one or more frequency transform units, in some embodiments.

The frequency coefficient string extraction unit 910 extracts a masked quantized frequency coefficient string recorded in the bitstream by using the frequency mask table. The frequency coefficient string extraction unit 910 generates a quantized frequency coefficient string by zero ('0') setting all quantized frequency coefficients at positions of no records in the bitstream from the quantized frequency coefficient string, by using the frequency mask table. The frequency mask tables used by the frequency coefficient string extraction unit 910 are identical for each slice or each picture, and are different for each block including one or more frequency transform units, in some embodiments.

The quantized coefficient string generation unit 930 generates a quantized frequency-transformed block by inversely scanning the quantized frequency coefficient string generated by the frequency coefficient string extraction unit 910.

In the frequency coefficient string decoding apparatus 900 according to at least one embodiment of the present disclosure, the operations of the frequency coefficient string extraction unit 910 and the quantized coefficient string generation unit 930 are slightly changed.

That is, after the table information extraction unit 920 extracts the information about the frequency mask table from the bitstream, the frequency coefficient string extraction unit 910 according to at least one embodiment of the present disclosure first extracts the masked quantized frequency coefficient string recorded in the bitstream by using the frequency mask table, and then generates the masked frequency-transformed block by inversely scanning the masked quantized frequency coefficient string.

The quantized coefficient string generation unit 930 generates the quantized frequency-transformed block by filling the low frequency region of the block having the size of the frequency transform unit with the coefficients of the masked frequency-transformed block generated by the frequency coefficient string extraction unit 910 and zero setting all frequency coefficients of the other regions of the block.

Figure 10:
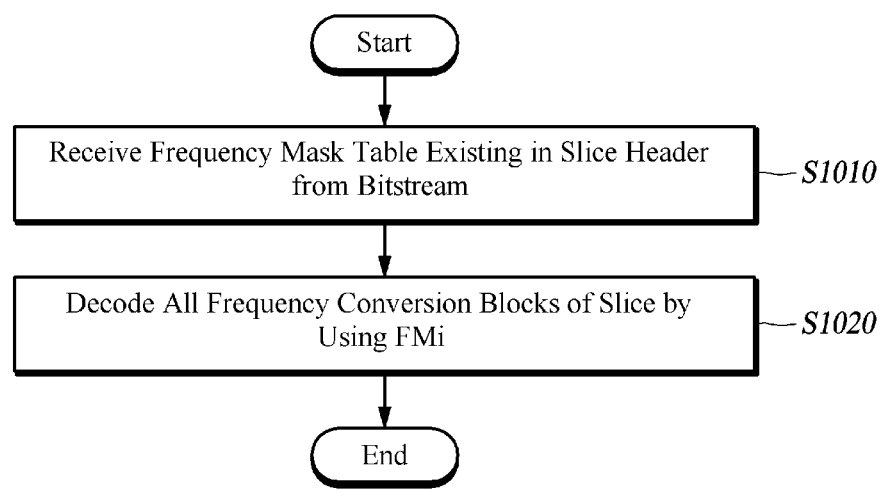
FIG. 10 is a flow chart of a method of decoding a slice by frequency mask tables according to at least one embodiment of the present disclosure.

FIG. 10 is a diagram exemplarily of a flow chart of a method of decoding a slice according to frequency mask tables.

As shown in FIG. 10, the decoding of the slice includes: receiving a frequency mask table (FMi) in a slice header from a bitstream in stage S1010; and reconstructing a quantized frequency coefficient string from the bitstream by using the received frequency mask table in stage S1020.

Meanwhile, the video encoding/decoding apparatus according to at least one embodiment of the present disclosure is configured by connecting an encoded data (bitstream) output terminal of the video encoding apparatus 100 of FIG. 1 to an encoded data (bitstream) input terminal of the video decoding apparatus 800 of FIG. 8.

The video encoding/decoding apparatus according to at least one embodiment of the present disclosure includes a video encoder for generating a prediction block by predicting a current block, generating a residual block by subtracting the prediction block from the current block. The video encoder is also for generating a frequency-transformed block by transforming and quantizing the residual block, generating a masked frequency-transformed block by masking the frequency-transformed block by using one or more frequency mask tables. The video encoder is also for encoding information about a frequency mask table used for masking the masked frequency-transformed block. The video encoding/decoding apparatus further includes a video decoder for extracting a masked quantized frequency coefficient string recorded in the bitstream by extracting the information about the frequency mask table from the bitstream. The video decoder is also for generating a quantized frequency coefficient string by zero setting all quantized frequency coefficients at positions of no records in the bitstream from a masked quantized frequency coefficient string, by using the extracted information about the frequency mask table. The video decoder is also for generating a quantized frequency-transformed block by inversely scanning the generated quantized frequency coefficient string.

The video encoder is implemented with the video encoding apparatus 100 according to at least one embodiment of the present disclosure, and the video decoder is implemented with the video decoding apparatus 800 according to at least one embodiment.

Meanwhile, the video encoding method according to at least one embodiment of the present disclosure includes a prediction step of generating a prediction block by predicting a current block. The method further includes a subtraction step for generating a residual block by subtracting the prediction block from the current block. The method further includes a transform/quantization step for generating a frequency-transformed block by transforming and quantizing the residual block. The method further includes an encoding step for generating a masked frequency-transformed block by masking the frequency-transformed block with a frequency mask table, and encoding information about a frequency mask table used for masking the masked frequency-transformed block.

Since the prediction step operatively corresponds to the prediction unit 110 or 120, subtraction step to subtraction unit 130, transform/quantization step to transform/quantization unit 140, and encoding step to encoding unit 150, detailed description thereof will not be repeated.

Meanwhile, the video decoding method according to at least one embodiment of the present disclosure includes a decoding step for extracting a masked quantized frequency coefficient string which is recorded in a bitstream, by extracting information about a frequency mask table from the bitstream. The decoding step further includes generating a quantized frequency coefficient string by zero setting all quantized frequency coefficients at positions of no records in the bitstream from a masked quantized frequency coefficient string, by using the extracted frequency mask table. The decoding step further includes generating a quantized frequency-transformed block by inversely scanning the generated quantized frequency coefficient string. The method further includes an inverse quantization/inverse transform step for reconstructing a residual block by inversely quantizing and inversely transforming the frequency-transformed block. The method further includes a prediction step for generating a prediction block by predicting a current block. The method further includes an addition step for reconstructing the current block by adding the reconstructed residual block and the prediction block.

Since the decoding step operatively corresponds to the decoding unit 810, inverse quantization/inverse transform step to inverse quantization/inverse transform unit 820, prediction step to prediction unit 830 or 840, and the addition step to addition unit 850, detailed description thereof will not be repeated.

The frequency-transformed block encoding method according to at least one embodiment of the present disclosure includes a frequency masking step for generating a masked frequency-transformed block by masking a frequency-transformed block with a frequency mask table. The method further includes a frequency scanning step for generating a masked frequency coefficient string by scanning a masked frequency-transformed block. The method further includes a mask block encoding step for encoding the masked frequency coefficient string. The method further includes a table information encoding step for encoding information about a frequency mask table used for masking the frequency-transformed block.

Since the frequency masking step operatively corresponds to the frequency mask unit 210, frequency scanning step to frequency scan unit 220, mask block encoding step to mask block encoding unit 230, and table information encoding step to table information encoding unit 240, detailed description thereof will not be repeated.

The frequency-transformed block encoding method according to at least one embodiment of the present disclosure includes a frequency scanning step for generating a frequency coefficient string by scanning a frequency-transformed block. The method further includes a frequency masking step for generating a masked frequency coefficient string by masking the frequency coefficient string with the scanned frequency mask table. The method further includes a mask block enabling step for encoding the masked frequency coefficient string. The method further includes a table information encoding step for encoding information about a frequency mask table used for masking the frequency-transformed block.

Since the frequency masking step operatively corresponds to the frequency mask unit 1110, frequency scanning step to frequency scan unit 1120, mask block encoding step to mask block encoding unit 1130, and table information encoding step to table information encoding unit 1140, detailed description thereof will not be repeated.

The video encoding/decoding method according to at least one embodiment of the present disclosure is realized by a combination of the video encoding method according to at least one embodiment of the present disclosure and the video decoding method according to at least eon embodiment of the present disclosure.

The video encoding/decoding method according to at least one embodiment of the present disclosure includes a video encoding process for generating a prediction block by predicting a current block, and generating a residual block by subtracting the prediction block from the current block. The video encoding process further includes generating a frequency-transformed block by transforming and quantizing the residual block, and generating a masked frequency-transformed block by masking the frequency-transformed block with a frequency mask table. The video encoding process further includes encoding information about a frequency mask table used for masking the masked frequency-transformed block. The video encoding/decoding process further includes a video decoding process for extracting a masked quantized frequency coefficient string recorded in the bitstream by extracting the information about the frequency mask table from the bitstream. The video decoding process further includes generating a quantized frequency coefficient string by zero setting all quantized frequency coefficients at positions of no records in the bitstream from the quantized frequency coefficient string, by using the information about the frequency mask table. The video decoding process further includes generating a quantized frequency-transformed block by inversely scanning the generated quantized frequency coefficient string.

The video encoding process is implemented with the video encoding method according to at least one embodiment of the present disclosure, and the video decoding process is implemented with the video decoding method according to at least one embodiment.

According to at least one embodiment of the present disclosure as described above, video compression efficiency is improved by encoding a frequency-transformed block while reflecting video characteristics with the use of frequency mask tables including non-encoding information according to the position of a frequency coefficient of a residual block.

In the description above, although all of the components of the embodiments of the present disclosure are explained as assembled or operatively connected as a unit, the present disclosure is not intended to limit itself to such embodiments. Rather, within the objective scope of the present disclosure, the respective components are selectively and operatively combined in any numbers, in some embodiments. Every one of the components are also implemented alone in hardware while the respective ones are combined in part or as a whole selectively and implemented in a computer program having program modules for executing functions of the hardware equivalents, in some embodiments. Codes or code segments to constitute such a program are easily deduced by a person skilled in the art. The computer program is stored in computer readable media, which in operation realizes the aspects of the present disclosure. The computer readable media includes magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

The invention claimed is:

1. A video decoding method performed by a video decoding apparatus, the method comprising:
generating a predicted block by predicting a current block to be decoded;
extracting a position information from a bitstream including the position information, wherein the position information indicates a position of the last coefficient which has a non-zero value in a scanning order within a transform unit;
generating a transform block having a block size of the transform unit by deriving, from the bitstream, coefficients preceding the last coefficient in the scanning order based on the position information;
generating a residual block by inversely quantizing and then inversely transforming the transform block; and reconstructing the current block by adding the predicted block to the residual block, wherein the generation of the transform block comprises:

setting coefficients following the last coefficient in the scanning order to 0, without extracting, from the bitstream, a value indicating whether or not a coefficient following the last coefficient in the scanning order is equal to 0;

extracting, from the bitstream, a value indicating whether or not a coefficient preceding the last coefficient in the scanning order is equal to 0;

when the extracted value is a first value, reconstructing the preceding coefficient corresponding to the extracted value from the bitstream; and when the extracted value is a second value, setting the preceding coefficient corresponding to the extracted value to 0.

2. The method of claim 1, wherein the position information and the value are values encoded by an arithmetic coding.

3. The method of claim 1, wherein the transform unit has a block size of $2^n \times 2^n$ where n is a positive integer in a predetermined range.

4. The method of claim 3, wherein the transform unit has a block size larger than 8×8.

5. The method of claim 3, wherein n has a value ranging from 2 to 5.

6. The method of claim 1, wherein the position information is information indicating two-dimensional location of the last coefficient within the transform unit.

7. The method of claim 1, wherein the position information and the value are defined by a frequency mask table.

* * * * *